United States Patent [19]

Hasselqvist et al.

[11] Patent Number: 4,568,008

[45] Date of Patent: Feb. 4, 1986

[54] DEVICE FOR CUTTING AND SHOOTING FIBRES WITH STABILIZED ORIENTATION

[75] Inventors: Stig E. A. Hasselqvist, Mjolby; Anders V. Thoreson, Rimforsa, both of Sweden

[73] Assignee: Ekebro AB, Orebro, Sweden

[21] Appl. No.: 513,156

[22] Filed: Jul. 12, 1983

Related U.S. Application Data

[63] Continuation-in-part of Ser. No. 190,778, Sep. 25, 1980, abandoned.

[30] Foreign Application Priority Data

Oct. 8, 1979 [SE] Sweden .................................. 7908300

[51] Int. Cl.[4] ................................................. B26F 3/00
[52] U.S. Cl. ..................................... 225/2; 83/98; 83/322; 83/349; 225/4; 225/103; 225/96; 227/156
[58] Field of Search ................... 225/94, 2, 95, 96, 1, 225/4, 103; 227/156; 140/139, 140; 83/349, 98, 322

[56] References Cited

U.S. PATENT DOCUMENTS

| | | | |
|---|---|---|---|
| 1,435,438 | 11/1922 | Wright | 140/140 X |
| 2,429,945 | 10/1947 | Rayburn | 225/96 X |
| 2,682,996 | 7/1954 | Forman | 83/349 X |
| 3,011,257 | 12/1961 | Bamberger | 225/103 X |
| 3,312,134 | 4/1967 | Roney | 83/349 |
| 3,334,532 | 8/1967 | Mylo | 83/349 X |
| 3,799,020 | 3/1974 | Hoelmer | 83/349 |
| 3,812,749 | 5/1974 | Lowen et al. | 83/349 X |
| 4,310,032 | 1/1982 | Normandin | 140/139 X |
| 4,363,453 | 12/1982 | Hill et al. | 83/349 X |

Primary Examiner—Frank T. Yost

[57] ABSTRACT

A device is provided for producing a large number of fibres, generally from a thin wire, in which a cutting mechanism imparts a high initial speed to the cut wire lengths, which are then oriented in the same alignment by being passed through a funnel-shaped opening into a pipe whose diameter is less than the length of the fibres; a method is provided for using the thin oriented and aligned fibres to bond and reinforce materials, for example, concrete, and to manufacture sandwich panels, in which the concrete is applied to the fibres shot into the sandwich panels in accordance with.

10 Claims, 16 Drawing Figures

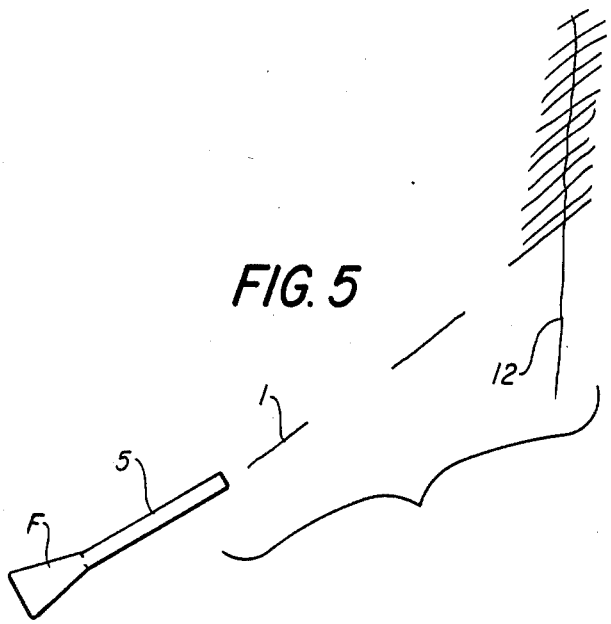
FIG. 5
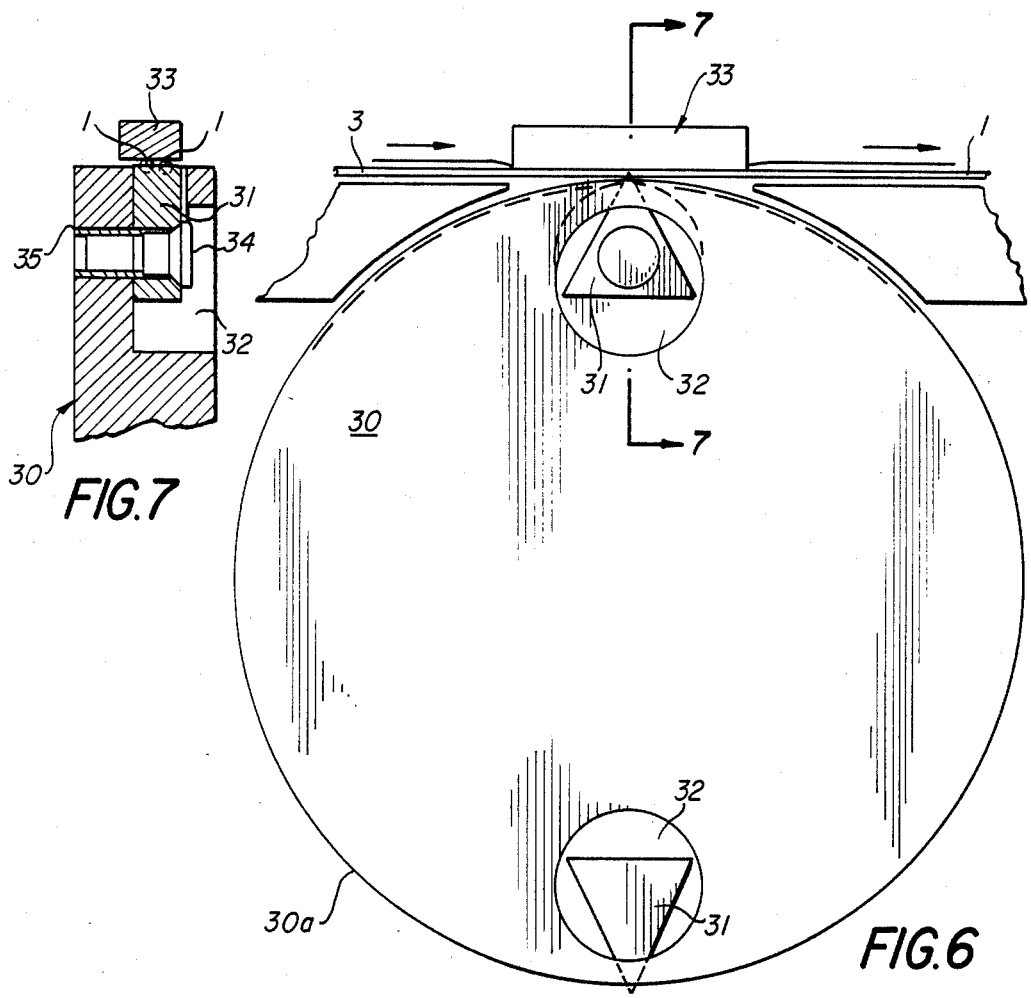
FIG. 7
FIG. 6

DEVICE FOR CUTTING AND SHOOTING FIBRES WITH STABILIZED ORIENTATION

This application is a continuation-in-part of Serial No. 190,778, filed Sept. 25, 1980, and now abandoned.

This invention provides a device for producing from a thin wire a large number of similarly aligned and oriented cut fibers, which can be propelled in such alignment towards a target at a very high initial speed, thereby making possible new applications for the fibres.

The fibres may, for example, be used to bond various materials to a base. In this case, the wire is fed between a pair of rollers and is cut off into lengths by a suitable rotating cutting device at a predetermined rate so that one end of each fibre length enters the base. In order for the fibre to strike the base with one end it is appropriate to orient it endwise so that its direction of travel is along its longitudinal axis. The orientation of the fibres in the selected alignment is stabilized with the aid of the cutting method used. Rotating cutting edges cut and sharpen the wire against a cutting block, which gives the fibres a stable travel along their longitudinal axis. The fibres are shot through a pipe having a diameter less than the length of the fibres, so that further control is achieved. The cutting device may be built into the feed rollers or arranged separately. In the latter case, close control of the speed of the cutting device is required.

In one practical design, a continuous or long length of wire 0.5 mm in diameter was cut into about 30 mm lengths at a wire feed rate of about 25 m/s and then shot through a passage consisting of a funnel and a pipe into a base of wood, the fibres entering the wood base sufficiently deep to become well anchored. In this way it was possible for the fibres to serve as a means for bonding a material such as concrete or plaster to a base while providing a certain degree of reinforcement. When using steel fibres a fibre-reinforced composite material with good characteristics has been achieved. Examples of suitable bases are wood, plasterboard, chipboard, foam plastic of the polystyrene or polyurethane type and damp, uncured concrete or plaster. Materials such as mineral wool or plastic foil have also proved to be suitable bases.

The technique of shooting a wire or a nail into material is not new. Bolt guns and staple guns are two examples where a metallic fixing is shot into and fixed in the base. Our invention however differs from previously known methods. Here, we start with a wire which is normally wound on a reel and is shot at such a speed that it enters the base. Since the speed is high, for instance 25 m/s, a very high production capacity is achieved. With a fibre diameter of 0.5 mm, 39 g/s or 2.3 kg/min are fed through. This produces more than 800 fibre lengths per second (at length=300 mm) which makes it possible both to bond and reinforce a surface material in an economic way.

This invention has a number of applications. The above describes its use in conjunction with bonding and reinforcing, for example, concrete. The method and equipment for fixing fibres in a base can be used for producing mats, filters, heat exchangers, brushes, and for reinforcement purposes where a fibre-carrying foil is employed to hold the fibres in a certain orientation before application of the matrix. In such an application it may be appropriate to use comparatively long fibres of, for example, 150 to 200 mm lengths. There are also applications in which the impact energy is utilized, for instance to clean surfaces or in weapons. By offsetting the axes of the drive rollers in different planes, the fibres can be given a rotation around their own longitudinal axis. In this way the continuous wire can be given better qualities when unwinding from the reel, as well as better transport between the feeding device for the wire and the cutting device. In addition, improved ballistic qualities of the fibres are obtained with better penetration of the base into which the fibres are shot.

In sprayed concrete technology today there are various methods of spraying fibres with compressed air so that they mix with the concrete either in a transport pipe or in the nozzle itself. Fibres which are sprayed in this way are however subject to tumbling and generally strike the base sideways-on, whereupon they often rebound. The problem of fibres rebounding from the sprayed concrete is considerable; proportions of shot fibres of between 30 and 60% have been named. Our invention orients the fibre so that its impact attitude is end-on, if the mouth of the pipe is held at a suitable distance from the base. This permits the fibres to enter and anchor in the newly sprayed, wet concrete much more easily. Very little rebounding occurs.

The drawings represent preferred embodiments of the invention and the following is a more detailed description thereof.

FIG. 5 shows the device of FIG. 1 arranged for shooting fibres with a predetermined impact energy into a thin sheet so that they penetrate the sheet;

FIG. 6 is a side view on an enlarged scale of the cutting wheel 2 of FIG. 1;

FIG. 7 is a cross-sectional view of the cutting wheel, taken along the line 7—7 of FIG. 6, and looking in the direction of the arrows;

Figure 1:
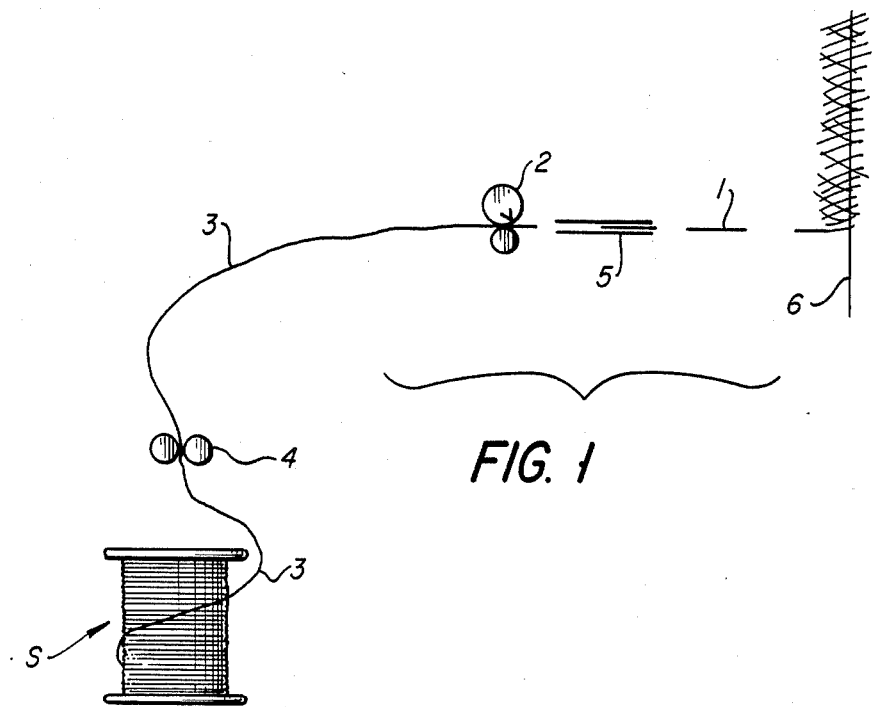
FIG. 1 shows a feeding and cutting device which shoots fibres into a base.

In the device shown in FIG. 1, wire 3 is fed in continuous length from spool 5 by a pair of rollers 4 and is cut up into short lengths 1 in a rotating cutting device 2 before being shot at high speed directly into a funnel F, which leads into pipe 5. This aligns the fibres efficiently in the same direction and orients them lengthwise so that they travel endwise longitudinally towards a suitable base 6 into which they penetrate to a certain depth, depending on their impact energy, as seen in FIG. 2.

Figure 2:
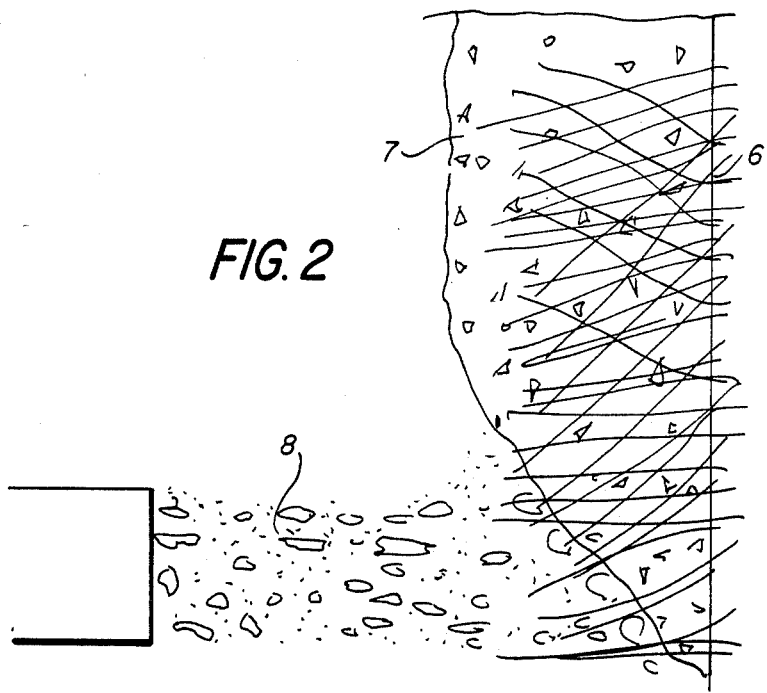
FIG. 2 shows fibres after having been shot into a base by the device of FIG. 1, with a layer being built up by spraying with a matrix material.

FIG. 2 shows the base 6 after the fibres have been shot in and with the matrix 8 being sprayed on. The stream of matrix material 8 has a certain amount of impact energy, so that upon impact on the base 6 it spreads out and fills in the space around the fibres satisfactorily, to form a matrix 7, in situ.

Figure 3:
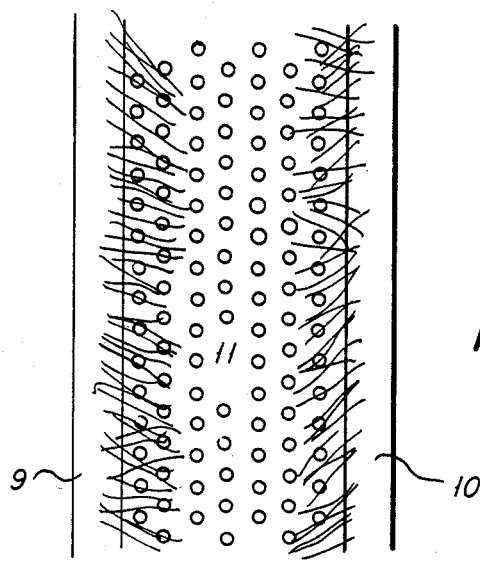
FIG. 3 shows a part of a sandwich construction.

In the sandwich shown in FIG. 3, the harder base panels 9 and 10 are shot and thus precoated with fibres, then placed in a mould and covered with foamed filler material 11. A method of producing such products in accordance with this invention involves placing a battery of hard panels shot with and thus coated with fibres so that a suitable filler material can be poured in and foamed as shown in FIG. 3, but in sequence.

Figure 4:
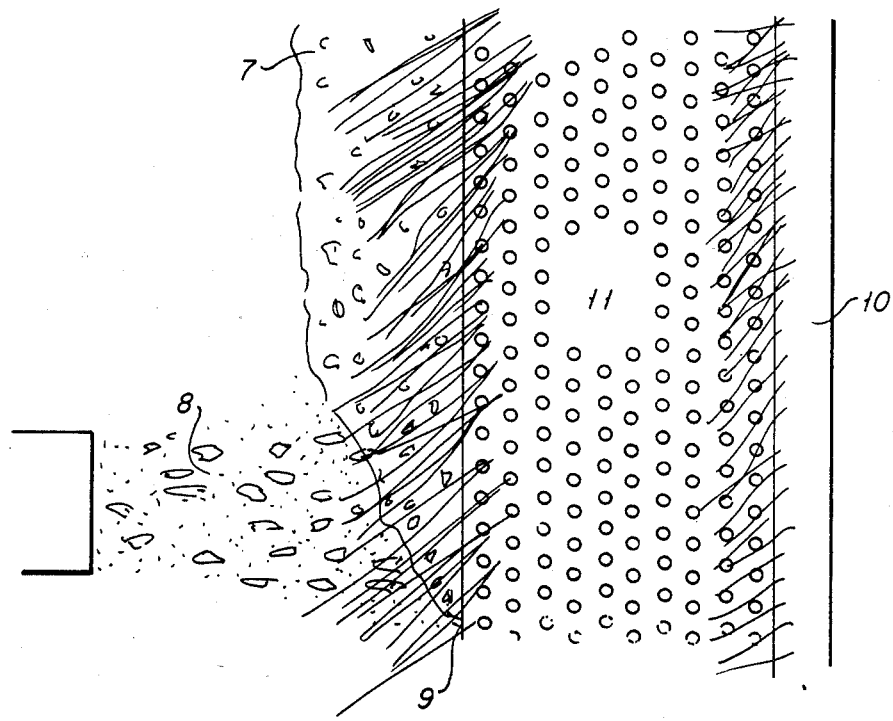
FIG. 4 shows a sandwich construction being built up by spraying with a matrix material.

In the sandwich shown in FIG. 4, a hard, fiber-shot and coated panel 10 has been filled with a foamed material 11 of, for example, polyurethane. The panel material 9 is then shot with fibres, and the matrix material 8 applied by spraying as shown in the Figure, to form the matrix 7.

In the arrangement shown in FIG. 5, fibre lengths 1 shot through funnel F and pipe 5 strike a thin foil 12 with such force that they go right through and project on each side thereof. The foil 12 thereby holds the fibres, and can be used as a fibre array or mat, or as a way of holding the fibres while a matrix is molded in place or sprayed on around them.

As best seen in FIGS. 6 and 7, the cutting wheel 2 comprises a circular, rotatable cutting wheel 30 having at least one, preferably two or more, cutting edges 31, two triangular in this case, hard metal bits fitted in counterborings 32 in the cutting wheel protruding radially outside the outer periphery 30a of the cutting wheel, and a stationary cutting block 33 above the wire 3 adjacent the cutting wheel periphery 30a.

Such cutting wheels operating against a cutting block are conventional, and described in the wire-cutting art, and do not per se form part of the invention, which resides in the combination with the cutting wheel and block of the guide tube orienting and aligning the fibres shot into the base.

The continuous wire 3 is fed by a pair of feed rollers 4 to the "nip" between the cutting wheel and the cutting block, where short fibre lengths 1 are cut off from the continuous wire by the passing cutting edge or edges. The cutting block can also be movable in the form of a rotatable counter roller. The cutting wheel strikes the wire against the cutting block 33, which is adjustably mounted via screw 34 threaded into a bore 35 in wheel 30 so that the distance between the block 33 and the cutting wheel may be adjusted to accept the selected diameter wire. This cutting wheel is designed to cut simultaneously two parallel wires 3.

Figure 8:
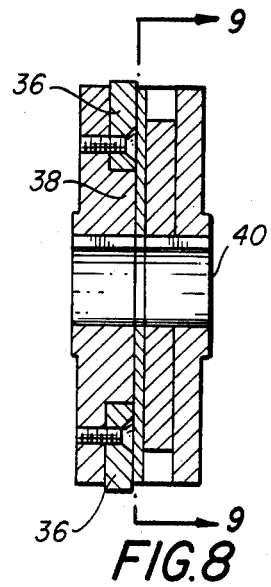
FIG. 8 is a cross sectional view on an enlarged scale of another embodiment of cutting wheel.
Figure 9:
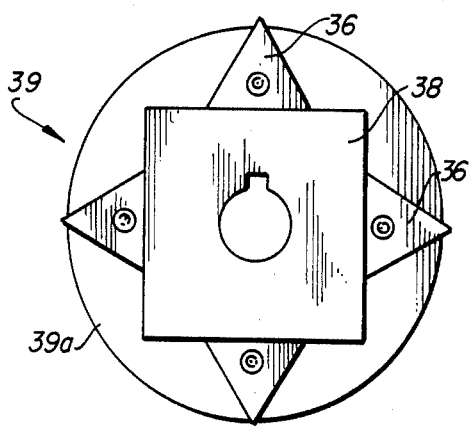
FIG. 9 is a side view of the cutting wheel of FIG. 8, taken along the line 9—9 of FIG. 8, and looking in the direction of the arrows.

FIGS. 8 and 9 show another type of cutting wheel 39 having a square hub portion 38 against the sides of which are mounted four triangular, replaceable hard metal cutting bits 36 having their respective cutting edges protruding outside the cutting wheel periphery 39a. FIG. 8 shows that two (or more) cutting wheels 39 of the type shown can be arranged side by side as a unit mounted on a common driveshaft 40 which can be driven by a motor.

Figure 10:
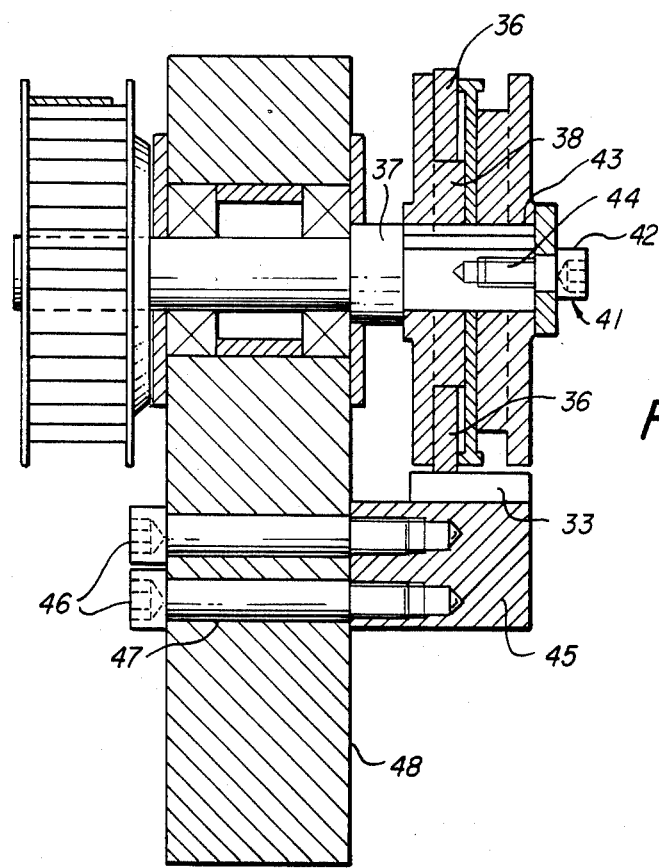
FIG. 10 shows the driveshaft mounting for the cutting wheel 2 of FIG. 1.

FIG. 10 shows one way of mounting the cutting wheel 39 on a driveshaft 37, which can be driven by an electric, pneumatic, or hydraulic motor (not shown). The cutting block 33 can also be an idler roller or a driven roller. The lock screw 41 threads into a socket 42 on the end 43 of the driveshaft and holds the wheel(s) 38 via washer 44. The cutting block 33 is supported on carrier 45 via bolts 46 passing through bores 47 in frame 48.

When the cutting wheel is driven by a pneumatic motor, the remaining kinetic and pressure energy of the exhaust air leaving the motor can be used to increase the kinetic energy of the fibres by leading the exhaust air into the guide tube 5 through which the cut wire lengths 1 are shot by the cutting mechanism.

Figure 11:
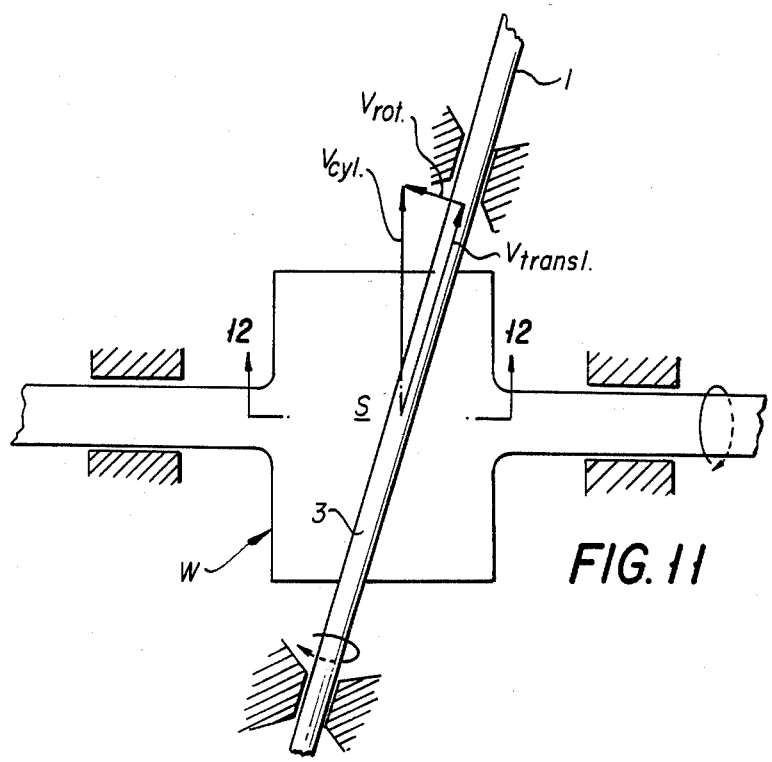
FIG. 11 is a sectional view through a cutting wheel imparting a rotational movement to the cut wire lengths.
Figure 12:
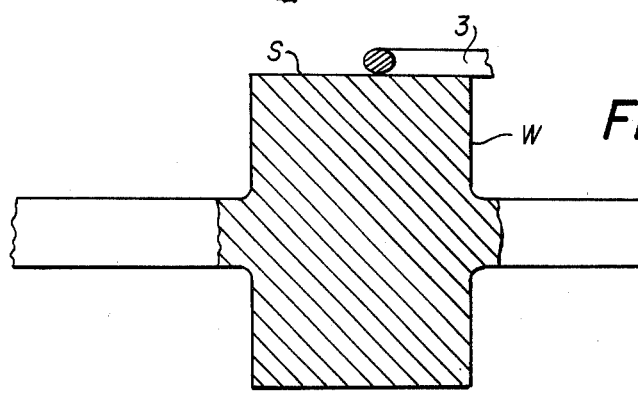
FIG. 12 is a view taken along line 12—12 of FIG. 11 and looking in the direction of the arrows.

FIGS. 11 and 12 show a cutting wheel W rotating about an axis which is not lying in a plane perpendicular to the longitudinal axis of the wire 3, its peripheral surface S in frictional driving contact with the straight wire 3. Consequently, the wheel's driving contact force imparts not only a pure translatory movement to the cut wire lengths 1 but also a rotational movement as shown by the arrows.

Figure 13A:
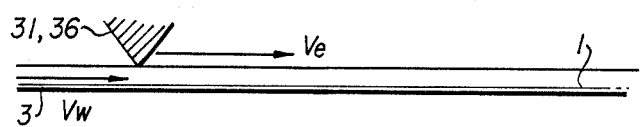
FIG. 13 is a composite detail view in three parts a,b,c, of a cutting wheel showing how a sharp end is imparted to the cut wire lengths.
Figure 13B:
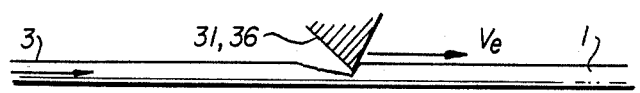
Figure 13C:
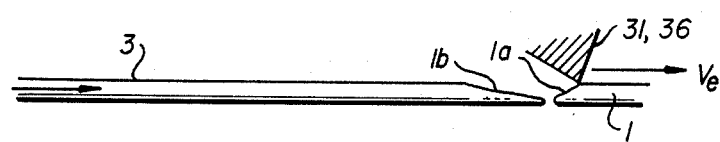
Figure 14:
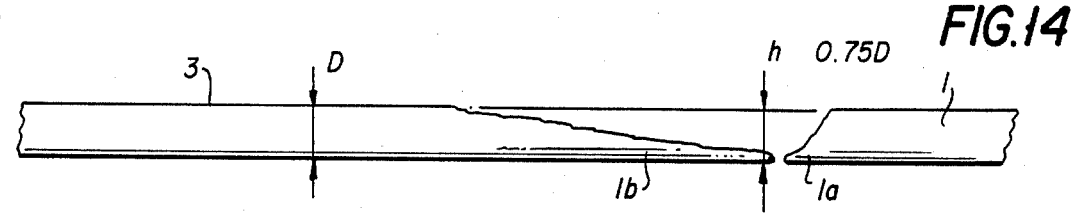
FIG. 14 is a further enlargement showing the cut wire resulting from FIG. 13c.

As best seen in FIGS. 13 and 14, if the speed $V_e$ of the cutting edge 31,36 cutting into the wire 3 at the nip is greater than the wire feed rate $V_w$, then the edge cuts into the wire and tears off a wire length 1, actually imparting a V-cut (with an obtuse V-angle) into the wire before same breaks at the bottom of the V-cut. The rear end 1a of the cut-off length of the continuous wire will then comprise one part of this V-cut, while the other part is on the front end of the next wire length to be cut off, which constitutes the sharpened front end 1b of the next fiber length that is cut from the remaining continuous wire.

The invention is applicable to any metal wire, such as iron, steel, brass, copper, Monel, Nichrome, nickel, tantalum, and aluminum, but steel wire is preferred.

The cutting edge should preferably cut into the wire to a depth of at least 75% of the wire diameter, as shown in FIG. 14, so that only some 25% of the wire diameter remains, which can be torn off by the higher speed of the cutting edge compared with the wire feed rate. This remainder in effect is equal in diameter to the clearance in the nip between the cutting edge and the cutting block.

Consequently, the clearance in the nip between the cutting edge and the surface of the cutting block should be about 25% of the wire diameter. The position of the cutting block in relation to the cutting wheel should be adjustable, so that the device can be used for different wire diameters, and so that one can compensate for wear of the cutting block and/or the cutting edge.

The tube or pipe 5 may have notches or cut-outs allowing the cutting wheel and cutting block to be placed close to the stabilizing and guiding portion of the tube.

The versions of the invention shown here are not by any means the only ones. The wire may alternatively consist of a continuous fibre of plastic or some form of mineral or natural fibre. It is also possible to manufacture fibres in advance and to use a feeding mechanism to force them through rollers which give them the necessary speed. In another design the fibres are driven by air through a pipe for directional stability. A magnetic field can be arranged both for driving and directional stability.

Further applications include short fibres for blasting and stress relieving processes (welding). In one variant mineral wool, for example, can be penetrated by fibres and attached to material placed behind it.

Having regard to the foregoing disclosure the following is claimed as the inventive and patentable embodiments thereof:

1. A device for cutting and shooting cut lengths of thin continuous wire endwise at high speed in a stabilized aligned orientation with respect to a base which is penetrated by the fiber ends and to which the fibers become affixed, comprising, in combination, a cutting wheel and a cutting block defining therebetween a nip through which wire to be cut is passed and cut, and a substantially straight tube whose diameter is less than the length of each cut wire length, the cutting wheel cutting thin continuous wire at a high speed against the cutting block into short wire lengths and propelling the cut wire lengths endwise at high speed into and through the tube, and the tube directing the cut wires in stabilized aligned orientation endwise to penetrate into and thereby become affixed to a base.

2. A device in accordance with claim 1 in which the cutting wheel and cutting block in cutting the wire simultaneously sharpen the ends of the cut wire lengths.

3. A device in accordance with claim 1 in which the cutting wheel has an axis of rotation offset in a different plane from the plane of travel of the wire being cut, so that the cut wire lengths are made to rotate around their longitudinal axis.

4. A device according to claim 1 in which the cutting wheel is adapted to be rotated at a speed greater than the rate of travel of the wire being cut, thereby accelerating the speed of the cut wire lengths and increasing their kinetic energy in the direction of travel through the tube.

5. A device in accordance with claim 1 in which the cutting wheel is driven pneumatically and the exhaust air therefrom is directed into the tube to increase the kinetic energy of the cut wire lengths.

6. A device according to claim 1 comprising a pair of feed rollers feeding the continuous wire to the nip of the cutting wheel and cutting block.

7. A process for cutting and shooting cut lengths of thin continuous wire endwise at high speed in a stabilized aligned orientation with respect to a base, which is penetrated by the fiber ends and to which the fibers become affixed, comprising cutting thin continuous wire into short wire lengths at a high speed between a cutting wheel and a cutting block defining therebetween a nip through which wire to be cut is passed and cut, and then the cutting wheel propelling the cut wire lengths endwise at high speed into and through a substantially straight tube whose diameter is less than the length of each cut wire length, thereby directing the cut wires in stabilized aligned orientation endwise to penetrate into and become affixed to a base.

8. A process in accordance with claim 7 in which the base is a thin sheet which the fibres pass through and extend out from the opposite side thereof.

9. A process in accordance with claim 7 in which the base is a sheet into which the fiber ends penetrate but do not pass through to the opposite side thereof.

10. A process in accordance with claim 7 in which the base carrying the fibers has a matrix material applied thereto.

* * * * *